(12) United States Patent
Iwata

(10) Patent No.: US 6,301,100 B1
(45) Date of Patent: Oct. 9, 2001

(54) PORTABLE ELECTRONIC DEVICE HAVING A CONNECTOR AND A CABLE FOR CONNECTING WITH AN EXTERNAL DEVICE

(75) Inventor: Yasuo Iwata, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/102,757

(22) Filed: Jun. 23, 1998

(51) Int. Cl.[7] .............................. H05K 5/00; H05K 7/00; G06F 1/16
(52) U.S. Cl. ........................... 361/683; 361/725; 345/169
(58) Field of Search .................... 361/681–683, 361/679, 724, 725, 727–729; 345/169

(56) References Cited

U.S. PATENT DOCUMENTS

| | | | |
|---|---|---|---|
| 5,574,625 | * | 11/1996 | Ohgami et al. . |
| 5,844,775 | * | 12/1998 | Lundberg .............................. 361/683 |
| 6,078,496 | * | 6/2000 | Oguchi et al. ........................ 361/683 |
| 6,079,993 | * | 6/2000 | Laine . |
| 6,101,086 | * | 8/2000 | Kim et al. ............................. 361/683 |

FOREIGN PATENT DOCUMENTS

| | | |
|---|---|---|
| 6-266471 | 9/1994 | (JP) . |
| 6-266484 | 9/1994 | (JP) . |
| 8-328697 | 12/1996 | (JP) . |
| 9-114549 | 5/1997 | (JP) . |

* cited by examiner

Primary Examiner—Jeffrey Donels
(74) Attorney, Agent, or Firm—Finnegan, Henderson, Farabow, Garrett & Dunner, L.L.P.

(57) ABSTRACT

A box of a device is comprised of a lid and a body for housing an electronic unit. An operating section of the device is arranged on the portion of the body surface covered by the lid. The covered portion of the body is formed with a hole for leading a cable from the inside to the outside of the body. A groove for accommodating a cable is formed continuous with the hole and a depression for accommodating a connector is formed adjacently to the groove in the surface of the upper cover. Further, another groove for guiding the cable out of the side of the body is formed in the surface of the body. When the portable electronic device is not in use, the connector and the cable are accommodated in the depression and the groove, respectively. The connector and the cable can be easily taken out of the depression and the groove, respectively, when the portable electronic device is used. At this time, the cable is led out of the guide groove. Therefore, no unreasonable force is exerted on the cable when the device is used.

12 Claims, 18 Drawing Sheets

PORTABLE ELECTRONIC DEVICE HAVING A CONNECTOR AND A CABLE FOR CONNECTING WITH AN EXTERNAL DEVICE

BACKGROUND OF THE INVENTION

1. Field of the Invention

The present invention relates to a portable electronic device comprising a connector for connecting with an external device and a cable for connecting the connector and the body of the electronic device, in which the connector and the cable can be accommodated in the device body.

2. Description of the Related Art

Portable electronic devices such as a personal computer and a word processor can transmit and receive data to and from a computer at a remote place by connecting with a communication system such as a portable telephone. Such a portable electronic device for connection with an external device requires a connector for connecting the external device and a flexible cable for connecting the connector and the body of the portable electronic device. Various conventional electronic devices have been proposed in which a connector and a cable can be accommodated in the device body.

For example, JP-A-6-266471 discloses a data storage device having a connection adaptor of IC memory card type providing a connector, by use of which data are transmitted to and received from a personal computer connected thereto. In such a data storage device, the connector is connected to the data storage device with a cable which is led out from the side of the housing of the device. A groove for accommodating the cable is formed in the side and the surface of the housing adjacent to the lead. A depression for accommodating the connector is formed in the surface of the housing continuous with the groove.

In this data storage device, the connector and the cable are normally accommodated in the depression and the groove, respectively, formed in the surface of the housing. When the data storage device is connected with a personal computer, on the other hand, the connector and the cable are removed from the depression and the groove, respectively, and the connector is connected to the personal computer. The disadvantage of this data storage device is that the exposure of the connector and the cable on the side and the surface of the device degrades the outer appearance of the device and that the connector and the cable is liable to come off or to be damaged under a force which may be applied to them unexpectedly. Also, the groove and the depression, which are formed over the side and the surface of the device, are difficult to cover.

On the other hand, JP-A-6-266484 discloses a keyboard having a coiled cable with a connector at the forward end thereof for connecting a personal computer to and from which data are transmitting and received. In this keyboard, the coiled cable is led out of the keyboard body from the back thereof. Also, a depression for accommodating the cable and the connector is formed in the lower surface of the keyboard body.

When the connector of this keyboard is connected to a personal computer, the connector and the cable are pulled out of the depression in the lower surface of the keyboard and the connector is connected to the personal computer. When the device is not in use, on the other hand, the connector and the cable are accommodated in the depression in the lower surface of the keyboard. This requires work such as lifting or reversing the keyboard inconveniently.

The conventional technique of JP-A-9-114549 discloses a communication card having a cable with a connector at the forward end thereof which is connected to a telephone line to transmit and receive data through the telephone line. This communication card contains an internal mechanism for taking up the cable, so that the connector and the cable are led out or taken up from the side of the card.

When this communication card is used, the connector and the cable are pulled out of the card against the force of the take-up mechanism and the connector is connected to the telephone line. After use, the cable is taken up into the card by the internal take-up mechanism, and the connector and the cable are accommodated in the card body in their entirety. Consequently, the card is superior in outer appearance and easy to handle. Nevertheless, the requirement of the cable take-up mechanism complicates the structure and increases the cost.

SUMMARY OF THE INVENTION

The object of the present invention is to provide a portable electronic device in which the cable and the connector can be accommodated in the device, and in which the structure for accommodating the connector and the cable is simplified and the whole device is reduced in size.

The present invention has been developed to achieve the above-mentioned object. According to the present invention, there is provided a portable electronic device comprising a body formed of an upper cover and a lower cover, and a lid joined pivotally to one side of the body for covering the surface of the upper cover, the body and the lid constituting a box structure for housing an electronic unit. The operating section of the portable electronic device is arranged on the surface of the upper cover of the body which is covered by the lid.

A connector used for connecting an external device is connected by a cable to the electronic unit in the body. The surface of the upper cover which is covered by the lid is formed with a hole through which the cable is led out from the interior out of the body. A groove for accommodating the cable is formed continuous with the hole and a depression for accommodating the connector are formed continuous with the groove in the surface of the upper cover. Further, groove other than the above-mentioned groove is formed for guiding the cable to the outer side of the body in the surface of the upper cover at a position continuous with the hole through which the cable is led out from inside to outside of the body.

When the portable electronic device is not in use, the connector and the cable are accommodated in the depression and the groove, respectively. The depression and the groove are arranged in the surface to which the lid is applied. When the lid is closed, therefore, the connector and the cable are accommodated in the body in their entirety. Also, the configuration for accommodation is simplified. When the portable electronic device is used, on the other hand, the connector and the cable can be taken out of the depression and the groove easily. In the process, the cable is guided out along the groove continuous with the hole leading from the interior to the exterior of the body. Consequently, no unreasonable force is exerted on the cable when the device is in use.

BRIEF DESCRIPTION OF THE DRAWINGS

The above objects and features of the present invention will be made apparent by the detailed description taken in conjunction with the accompanying drawings, in which:

FIGS. 5 to 11 show the electronic device of FIG. 1 with the lid thereof closed, in which FIG. 5 is a perspective view, FIG. 6 a top plan view, FIG. 7 is a right side view, FIG. 8 is a left side view, FIG. 9 is a front view, FIG. 10 is a rear view, and FIG. 11 is a bottom view;

FIGS. 20 to 28 show component parts of the lid of FIG. 18, in which FIG. 20 shows a configuration of the body of the lid, FIG. 21 shows a configuration of a decorative panel, FIG. 22 shows a configuration of a fixed member, FIG. 23 shows a configuration of a liquid crystal display panel, FIG. 24 shows the reverse side of the liquid crystal display panel, FIG. 25 shows a side of the liquid crystal display panel, FIG. 26 is a perspective view of the liquid crystal display panel, FIG. 27 is a sectional view taken in line II—II of FIG. 23, and FIG. 28 is a sectional view taken in line III—III of FIG. 23;

DESCRIPTION OF THE PREFERRED EMBODIMENTS

Figure 1:
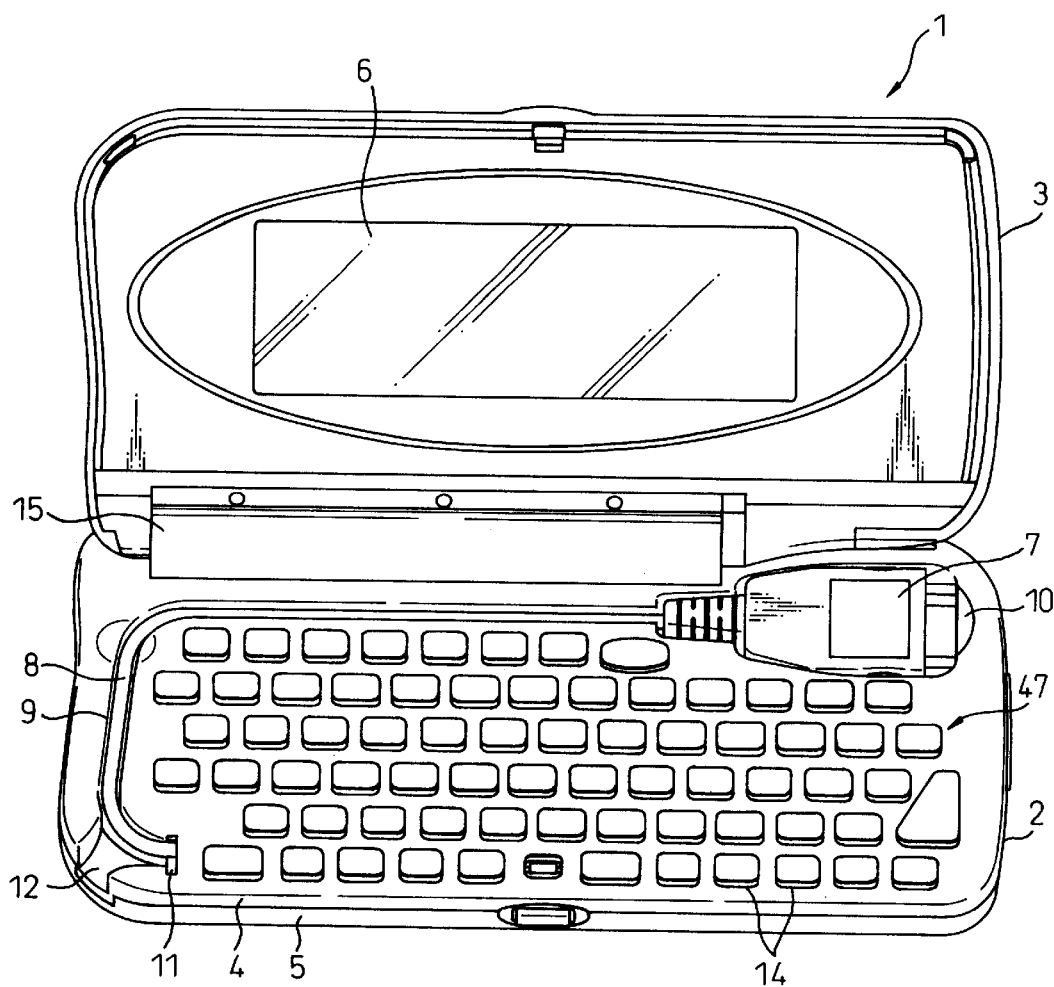
FIG. 1 shows a portable electronic device with the lid thereof open according to the invention.

FIG. 1 shows an outer appearance of a portable electronic device according to the present invention. The portable electronic device shown has a lid opened with an operating board and a display screen exposed.

The portable electronic device 1 comprises a body 2 and a lid 3. The lid 3 is mounted rotatably by a hinge mechanism on the back of the body 2 to cover the surface of the body 2. The hinge mechanism is covered by a hinge cover 15. The body 2 includes an upper cover 4 and a lower cover 5 and contains an electronic unit therein. The lid 3, the upper cover 4 and the lower cover 5 are formed by molding plastics.

The surface of the upper cover 4 is used as an operating section 47 on which various keys 14 are arranged. The operating section 47 is covered by the lid 3. A display window 6 is arranged in the lid 3. Further, a space for accommodating a connector 7 for connecting to a portable telephone and a cable 8 for connecting the connector 7 to the electronic unit in the body 2 are provided on the surface of the upper cover 4. A hole 11 for leading the cable 8 into and out of the body 2 is formed at the left corner on this side of the upper cover 4. The cable 8 is led horizontally through the hole 11 out of the body 4. A groove 9 for accommodating the cable 8 is formed adjoining to the hole 11. Further, a depression 10 for accommodating the connector 7 is formed continuous with the groove 9. The depression 10 is arranged at the right side of the upper cover 4 far from this side. The groove 9 passes between the operating section 47 and the periphery of the upper cover 4 and connects the hole 11 and the depression 10 to 5 each other. A groove 12 for guiding the cable 8 out of the body is formed from the hole 11 to the extreme end of the corner on catch side of the upper cover 4. As a result, when the connector 7 and the cable 8 are taken out, the cable 8 is led out of the body 2 at an angle of about 45° from the corner of the upper cover 4.

Normally, the connector 7 and the cable 8 are accommodated in the depression 10 and the groove 9, as shown in FIG. 1. When the lid 3 is closed, the connector 7 and the cable 8 are covered and protected by the lid 3 in their entirety together with the operating section 47. The groove 9 and the depression 10 for accommodating the connector 7 and the cable 8 have a simple structure and can be easily fabricated by forming them together at the time of molding the upper cover 4.

Figure 2:
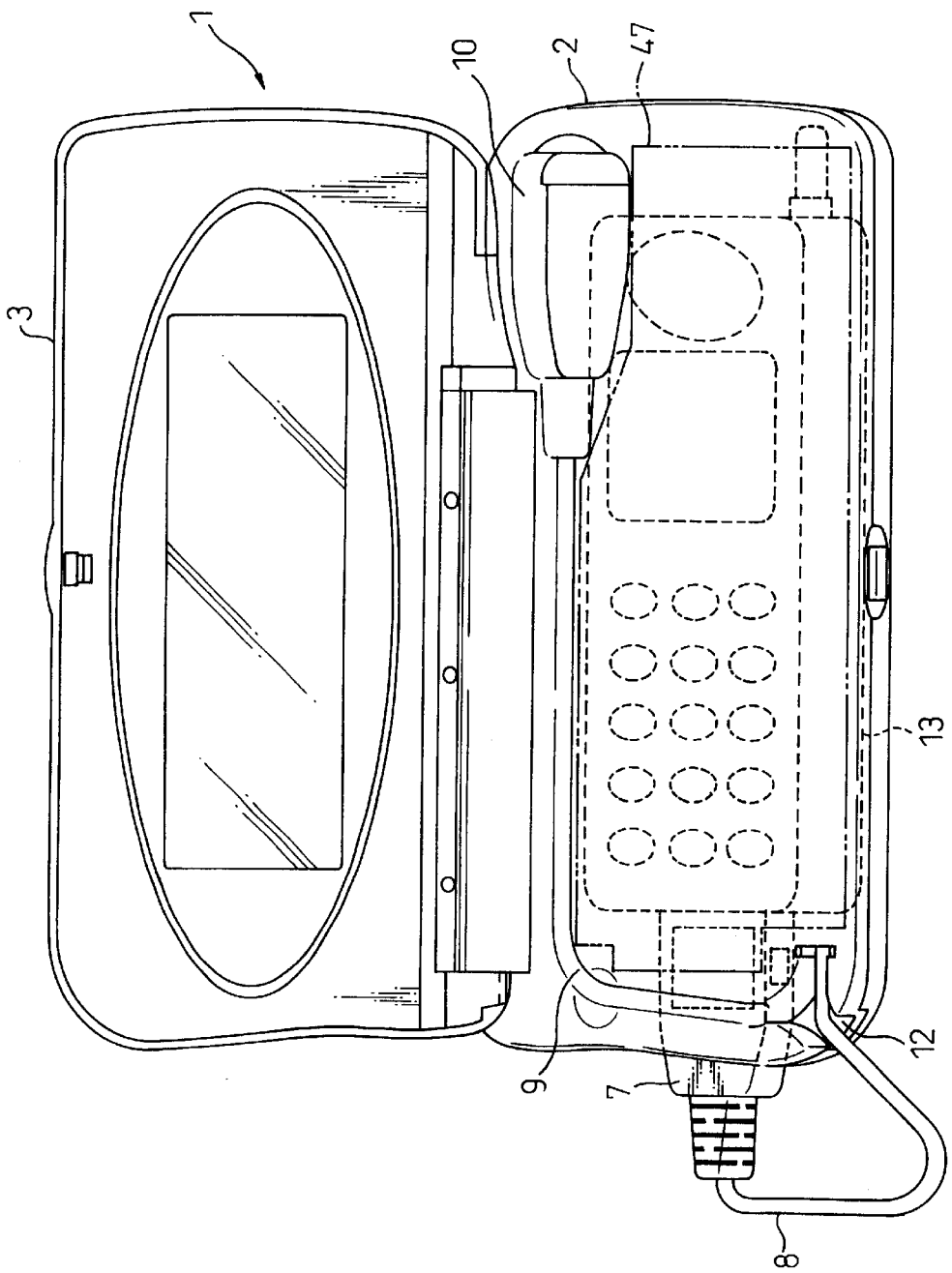
FIGS. 2 and 3 show a portable electronic device according to the invention connected to a portable telephone.
Figure 3:
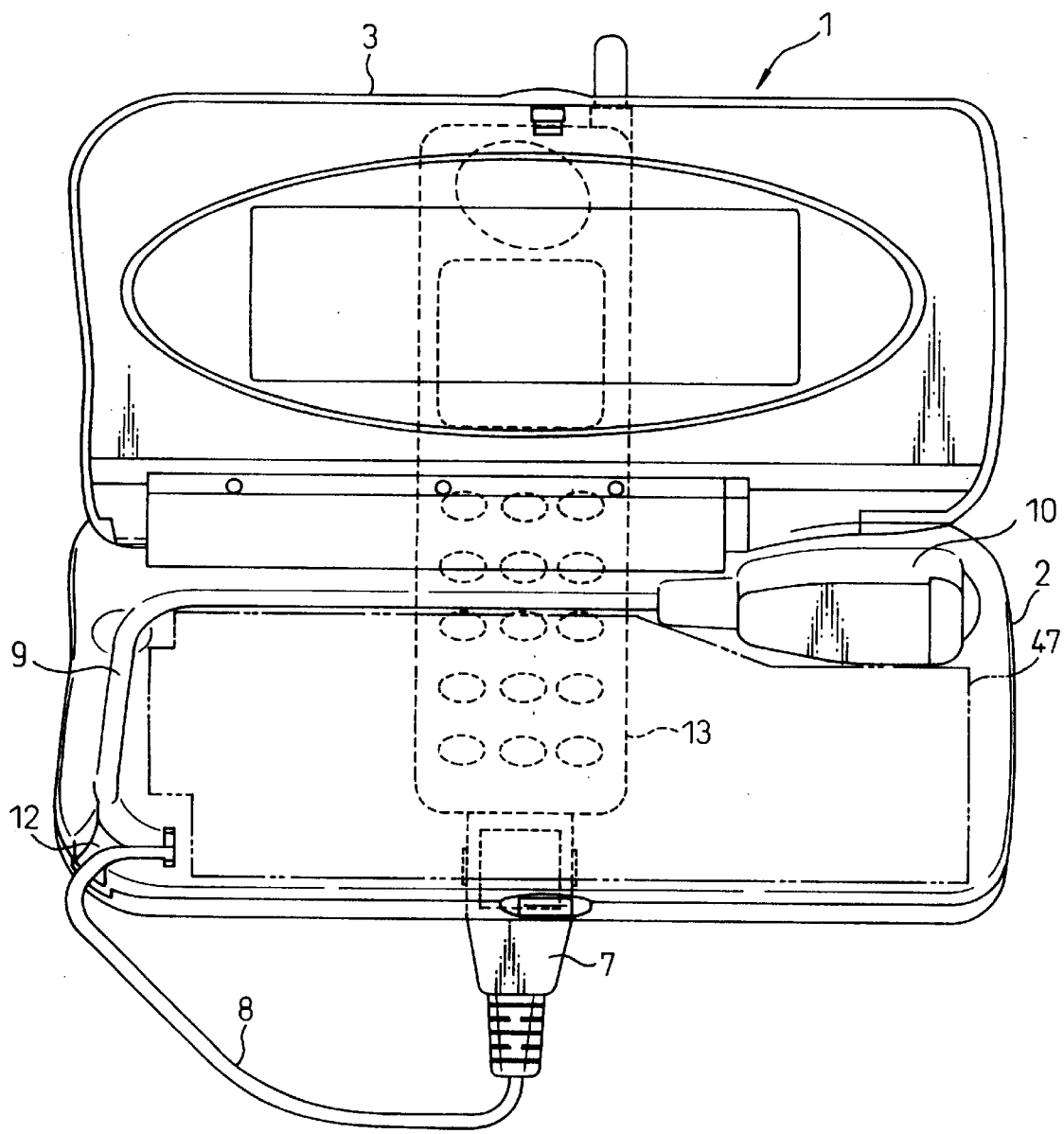

FIGS. 2 and 3 show a portable electronic device 1 connected to a portable telephone 13 for transmitting and receiving data to and from a host computer, a PDA (personal digital assistant) or an external telephone. FIG. 2 represents a case in which the portable telephone is held horizontally, and FIG. 3 a case in which the portable telephone 13 is held vertically. The connector 7 and the cable 8 are removed from the depression 10 and the groove 9, respectively, and the connector 7 is connected to the connector of the portable telephone 13. The cable 8, led out of the hole 11 communicating with the interior of the body 2, is guided out of the body by way of the groove 12 formed at the corner of the body 2. According to this invention, the portable electronic device 1 can be reduced in size and weight. The keys on the operating section 47 can be operated by one hand while holding the portable electronic device 1 and the portable telephone 3 in the other hand. In FIGS. 2 and 3, the operating section 47 is designated by alternate long and two short dashes line, and the keys 14 are not shown. The cable 8, which is led out of the body 2 an an angle of about 45° from the hole 11, can easily correspond to the position in which the device is held as shown in FIGS. 2 or 3 and therefore no unreasonable force is exerted to the cable 8. Also, as shown, the lid 3 can be closed with the cable 8 taken out.

Figure 4:
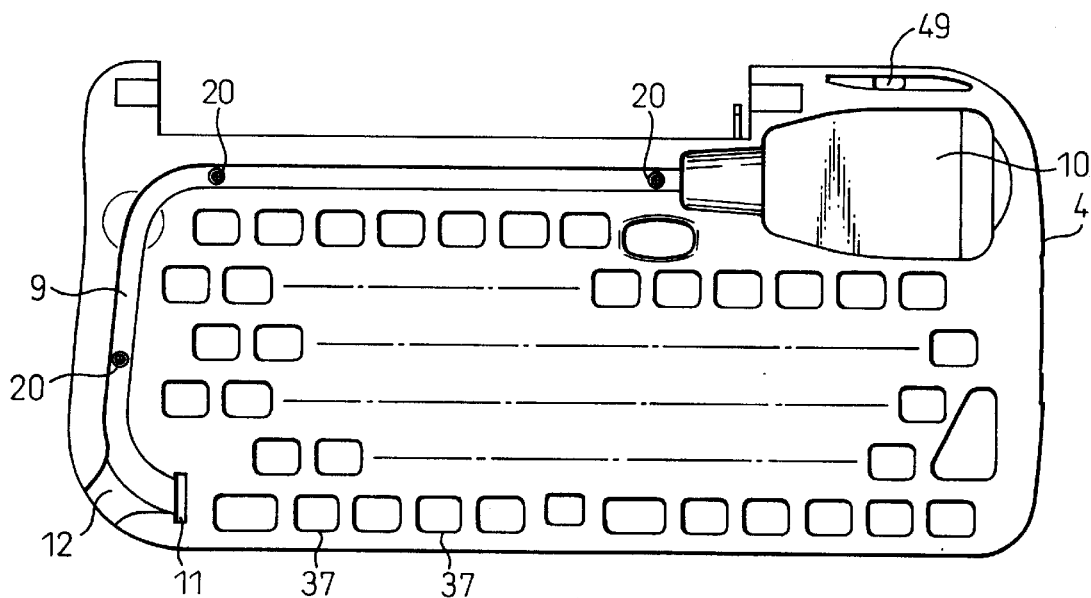
FIG. 4 is a plan view of the upper cover of the portable electronic device of FIG. 1.

FIG. 4 is a plan view showing a configuration of the upper cover 4. The surface of the upper cover 4 is formed with a plurality of key holes 37 through which the operating keys are exposed. The depression 10 for accommodating the connector is arranged at the upper right corner, and the groove 9 continued with the depression 10 and adapted for accommodating the cable is arranged between the key holes 37 and the periphery of the upper cover 4. The other end of the groove 9 continued with the interior of the upper cover 4 at the hole 11. Also, a groove 12 is formed which extends from the hole 11 to the lower left corner of the upper cover 4. The notch formed on the reverse side of the upper cover 4 is for arranging a hinge mechanism.

A plurality of holes 20 for fixing the upper cover 4 and the lower cover 5 by screws are formed in the groove 9 for accommodating the cable 8. FIG. 4 shows the state in which the screws are inserted in the holes 20. A plurality of bosses for fixing the screws are formed at points of the lower cover 5 corresponding to the holes 20. When the upper cover 4 and the lower cover 5 are fixed, they are set in registry with each other and screwed from the holes 20 in the groove 9. In this way, the groove 9 for accommodating the cable is used as a location of the holes 20. Therefore, the screw space is saved and the device can be reduced in size.

The upper cover 4 is further formed with a strap-attaching hole 49. Depending on the requirements of the user, a strap can be attached using this hole 49. This hole 49 is formed beside the hinge mechanism at the far end of the connector-accommodating depression 10.

As shown in FIG. 4, the rationalized arrangement on the upper cover 4, i.e. on the body surface can maintain a small surface area of the upper cover 4 in spite of the presence of the groove 9 and the depression 10 for accommodating the connector 7 and the cable 8.

FIGS. 5 to 11 show an outline of the portable electronic device 1. In each drawing, the lid 3 of the portable electronic device 1 is closed.

Figure 5:
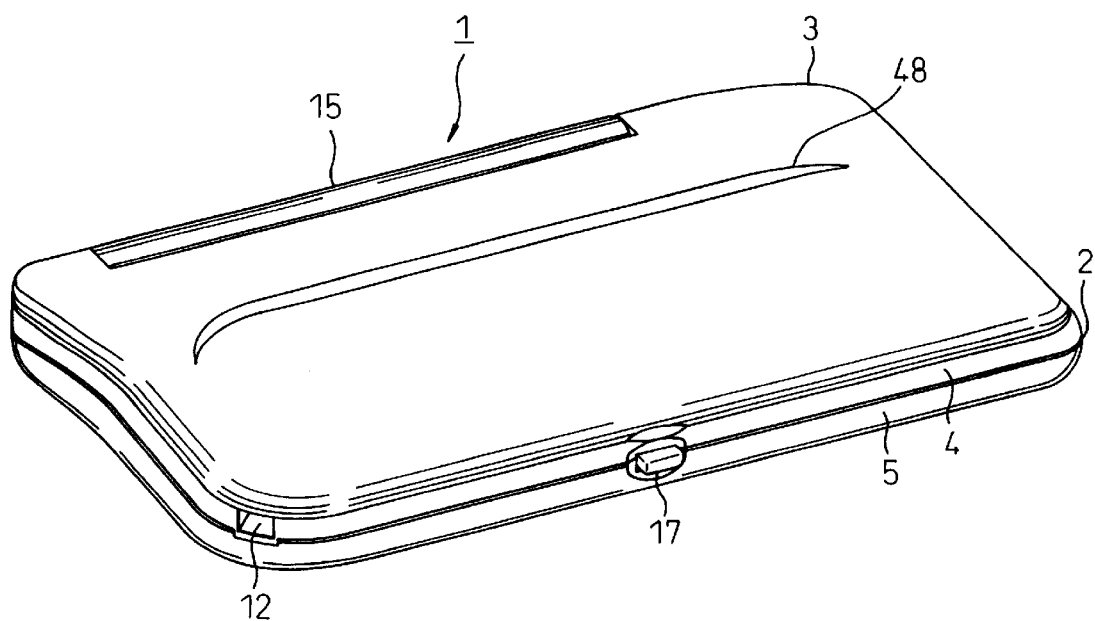

FIG. 5 shows the device as viewed diagonally from the top. The lid 3 is rotatably supported by the hinge mechanism on the far side of the body 2. FIG. 5 shows a hinge cover 15 for the hinge mechanism. Also, a open/close knob 17 for the lid 3 is arranged on the front of the body 2. When opening the lid 3, the knob 17 is pressed toward the body 2. Then, a latch, not shown, is released, and the lid 3 can be opened. This knob 17 is also shown in the top plan view of FIG. 6, the front view of FIG. 9 and the bottom view of FIG. 11.

In FIG. 5, a groove 12 for leading the cable is visible at the front corner of the body 2. This groove 12 is shown also in the top plan view of FIG. 6 and the left side view of FIG. 8. FIG. 5 shows the state in which the lid 3 is closed and the connector 7 and the cable 8 are accommodated in the device 1. It is also possible to close the lid 3 with the cable 8 led out of the hole 12. The lid 3 is formed with a step 48.

Figure 6:
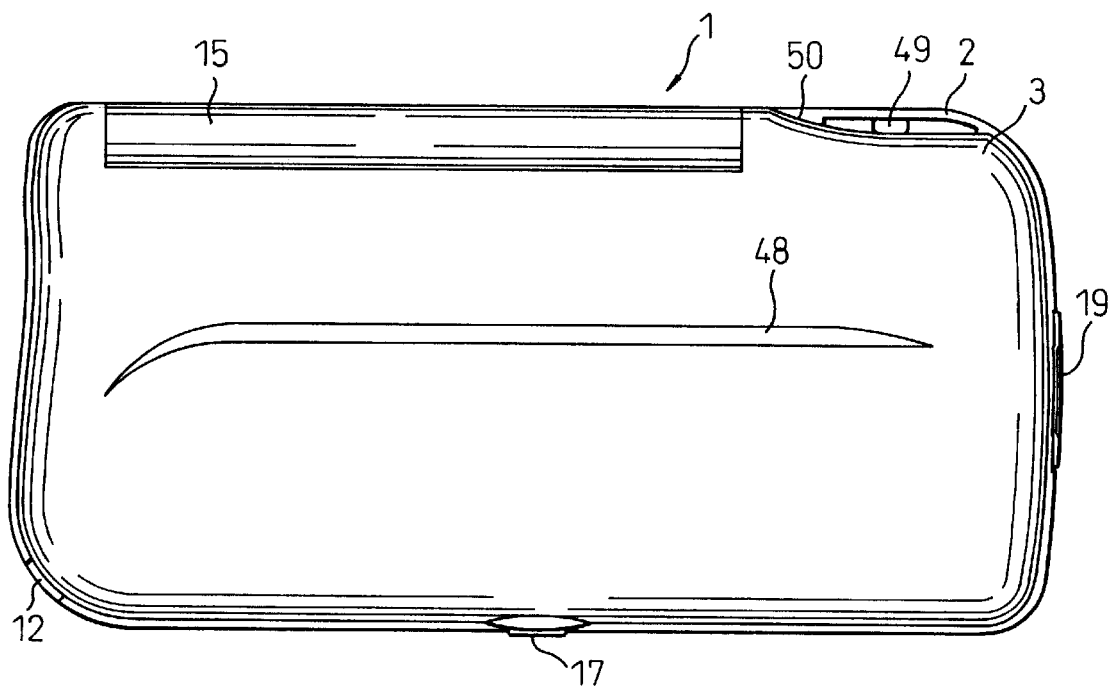

FIG. 6 shows the device 1 as viewed from the top. A cover 19 of the connector for connecting a personal computer is shown on the right side of the body 2. This connector cover 19 is shown also in the right side view of FIG. 7.

FIG. 6 shows a hole 49 for attaching a strap on the far side of the body 2. The hole 49 for attaching a strap is formed through both the upper cover 4 and the lower cover 5 of the body 2. The strap hole 49 is shown also in FIGS. 7, 10 and 11. Also, FIG. 6 shows a notch 50 formed in the portion of the lid 3 corresponding to the strap hole 49 formed on the far side of the body 2.

Figure 12:
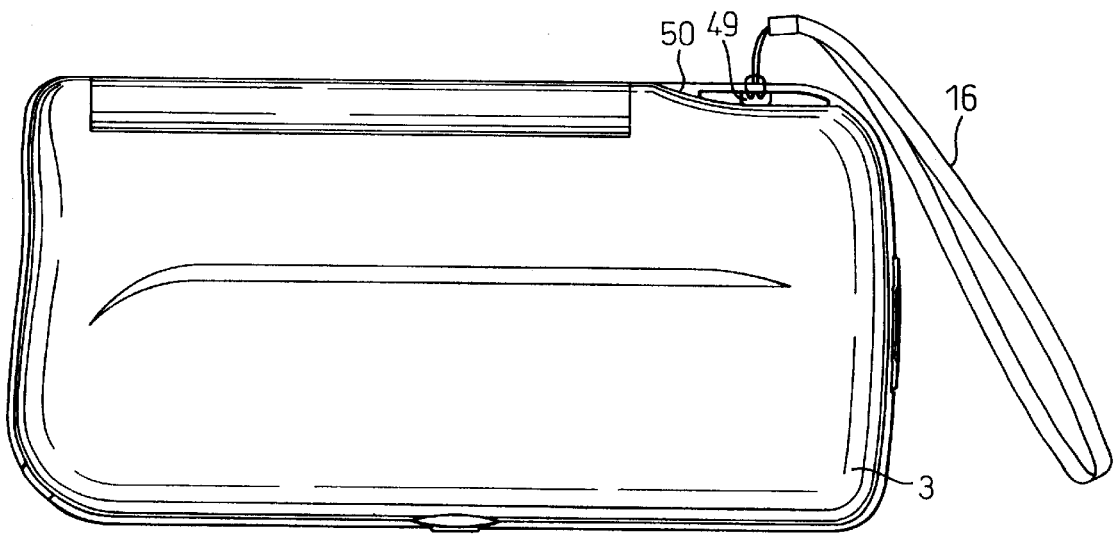
FIG. 12 is a top plan view of a portable electronic device according to the invention with a strap attached thereto.
Figure 13:
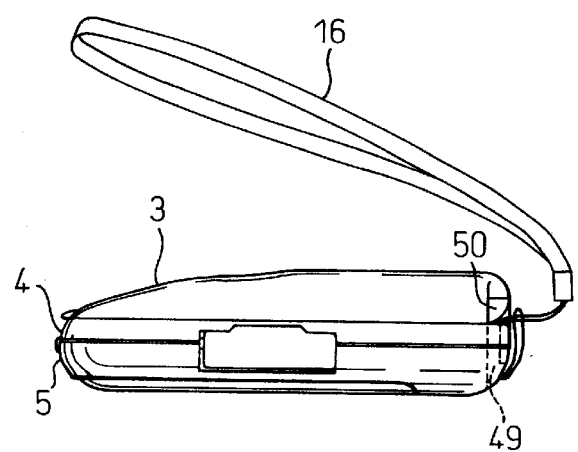
FIG. 13 is a right side view of the portable electronic device of FIG. 12.
Figure 14:
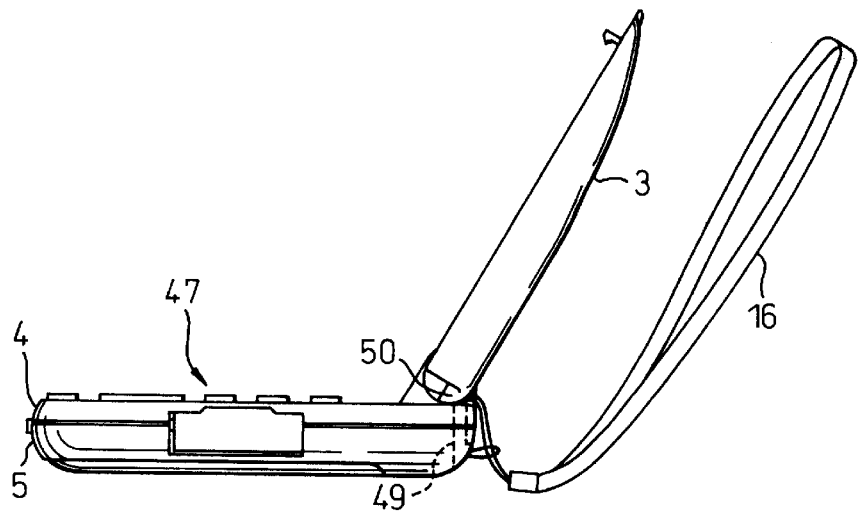
FIG. 14 is shows the portable electronic device of FIG. 12 with the lid thereof open.
Figure 15:
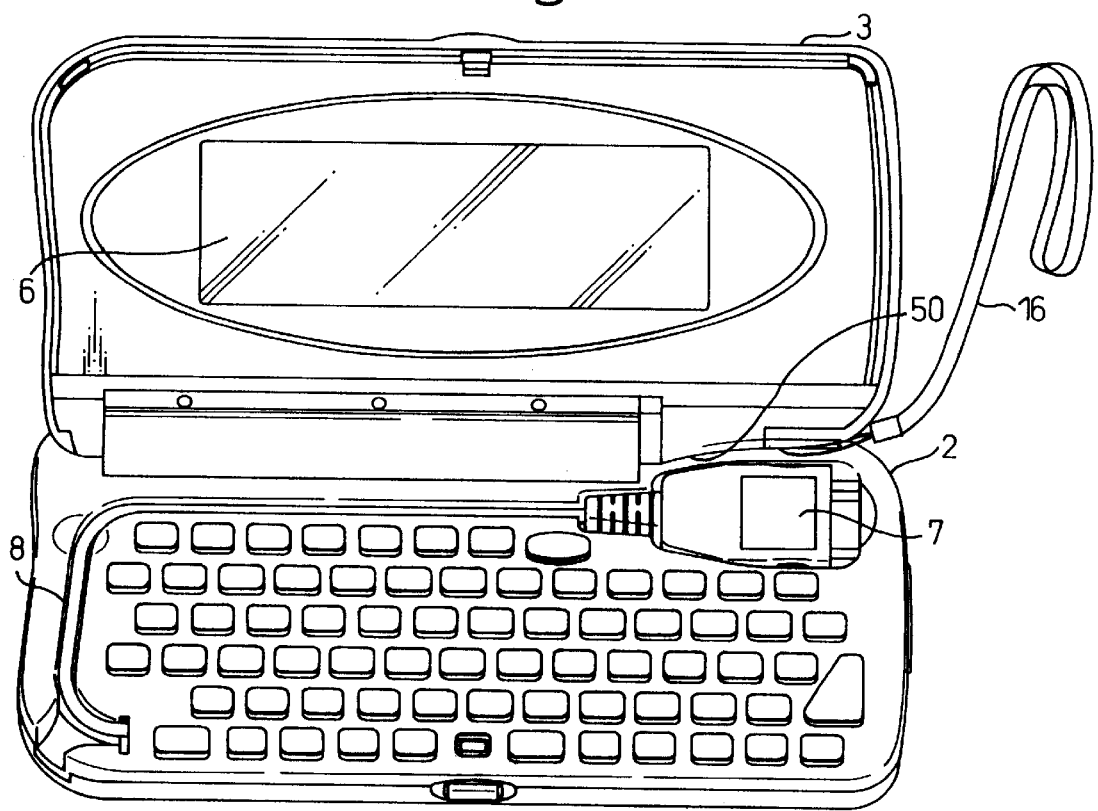
FIG. 15 is a front view of the portable electronic device of FIG. 14.

FIGS. 12 to 15 show the state in which the strap 16 is attached to the portable electronic device 1. FIG. 12 shows the state of the device 1 as viewed from the top with the lid 3 closed, FIG. 13 shows the right side of the device 1 with the lid 3 closed, FIG. 14 is a right side view of the device 1 with the lid 3 open, and FIG. 15 shows the state of the device 1 with the lid open as viewed from the front thereof. These drawings show that even when the lid 3 is open or closed, the lid 3 does not damage the strap 16 by the notch 50. Also, as shown in FIG. 15, the notch 50 of the lid 3 forms a space facilitating the taking out of the connector 7 when the lid 3 is opened.

Figure 7:
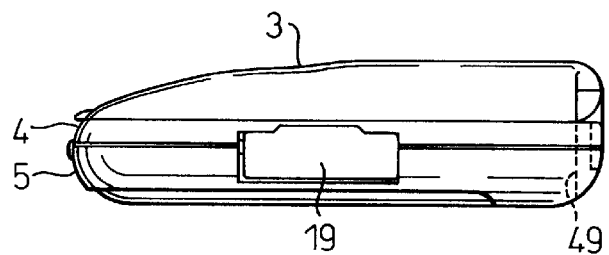

FIG. 7 is a right side view of the device 1. The strap hole 49 is shown formed through both the upper cover 4 and the lower cover 5, and it can be seen that a cover 19 of the connector for connecting the computer is arranged on the right side of the body 4.

Figure 8:
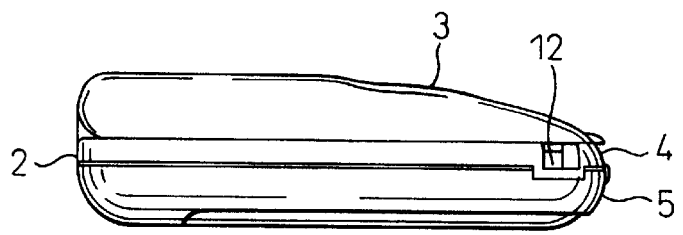
Figure 9:
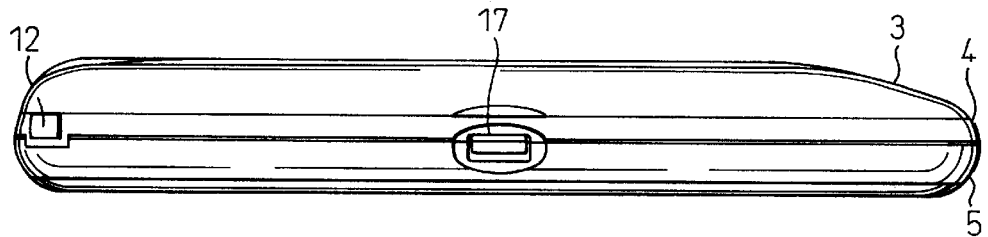

FIG. 8 is a left side view of the device 1. A hole 12 for leading the cable 8 out of the body 2 is shown. FIG. 9 is a front view of the device 1. A hole 12 for leading out the cable and a knob 17 for opening/closing the lid 3 are shown.

Figure 10:
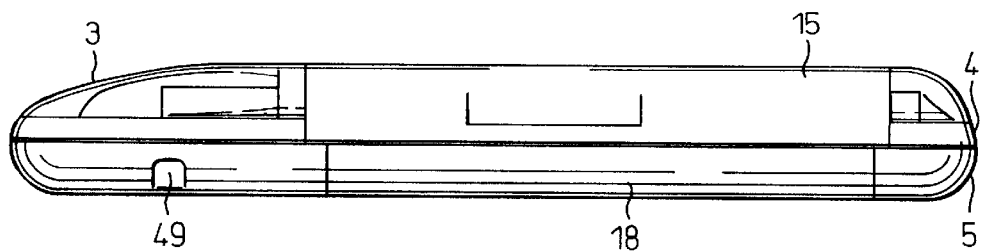
Figure 11:
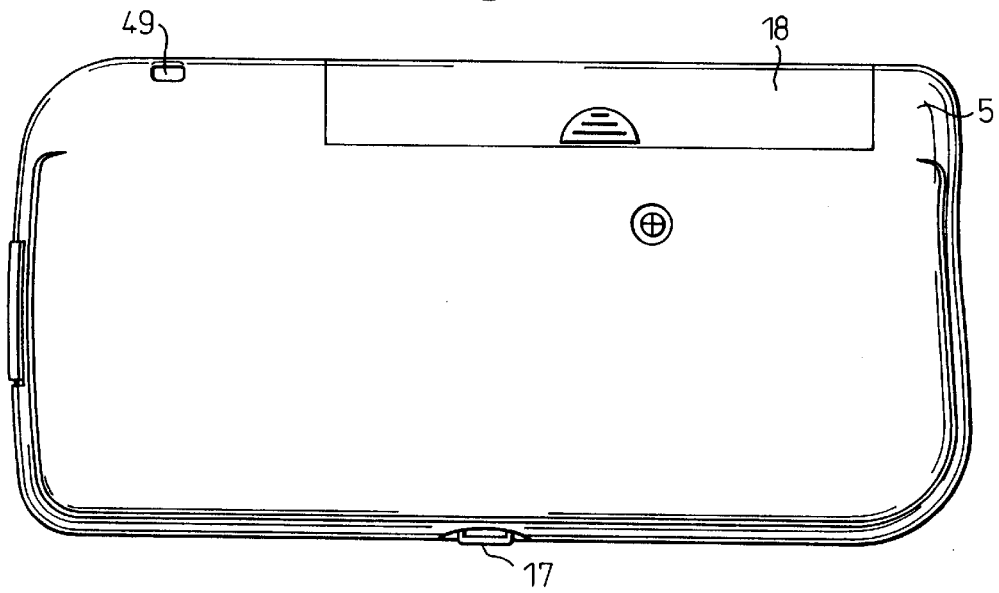

FIG. 10 is a rear view and FIG. 11 is a bottom view of the device 1. These drawings show that a battery cover 18 is arranged on the hinge side of the lower cover 5 of the body 2 under the hinge cover 15. A battery, not shown, is arranged in the internal space of the body 2 covered by the battery cover 18. This space is located under the hinge mechanism. In this way, the battery is arranged in an otherwise extraneous space, and therefore the internal components of the device 1 are arranged rationally, thereby contributing to a reduced size.

Figure 16:
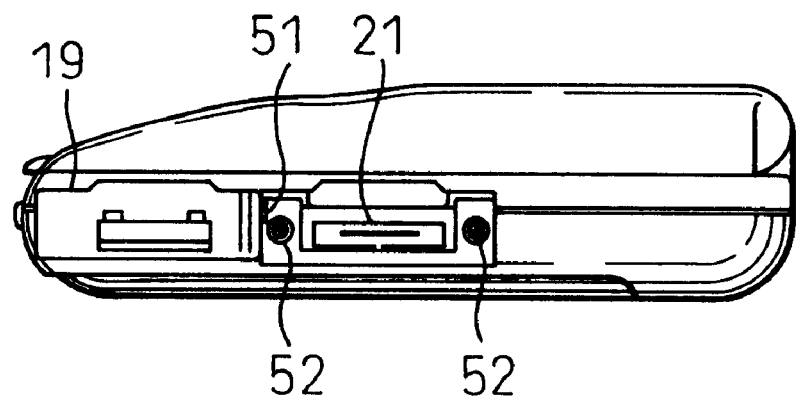
FIG. 16 shows the portable electronic device with the connector cover open in the right side view of FIG. 7.

FIG. 16 shows the state of the device 1 with the connector cover 19 open on the right side thereof. The connector 21 is arranged at the point of engagement between the upper cover 4 and the lower cover 5. The connector cover 19 is formed of a soft plastic material, a rubber material or silicon rubber material. A hinge 51 is formed at an end of the cover 19 and is held between the upper cover 4 and the lower cover 5. When the cover 19 is opened, a force is applied in such a direction as to remove the cover 19 from the body 2. The cover 19 is deformed due to its flexibility and disengages from the body 2. When the cover 19 is closed, on the other hand, the cover 19 is pushed in toward the body 2. Due to the flexibility thereof, the cover 19 engages with the body 2 in a state covering the connector 21 (state shown in FIG. 7).

Figure 17:
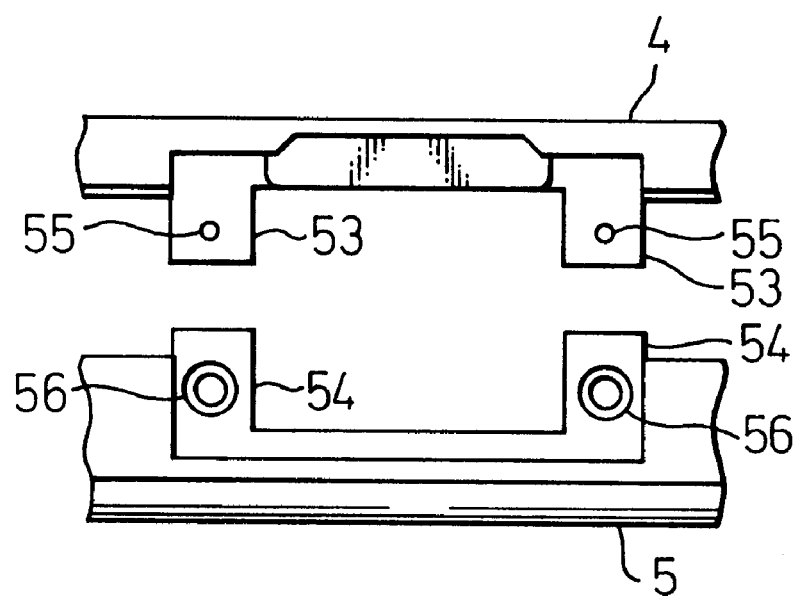
FIG. 17 is an enlarged view of the junction between the upper cover and the lower cover of FIG. 16.

FIG. 17 shows the state in which the upper cover 4 and the lower cover 5 are separated vertically at the portion where the connector 21 of FIG. 16 is housed. According to this example, the upper cover 4 and the lower cover 5 are screwed fixedly to each other by use of the portion covered by the connector cover 19. Two downward protrusions 53 are formed on the upper cover 4 on the two sides of the connector 21, and two upward protrusions 54 are formed on the lower cover 5. The protrusions 53, 54 are formed with threaded holes 55, 56, respectively. As shown in FIG. 16, when the upper cover 4 is combined with the lower cover 5, the protrusions 54, 55 are superposed so that the threaded holes 55, 56 come in registry with each other. The upper cover 4 and the lower cover 5 are screwed together using the threaded holes 55, 56. In this way, a place otherwise constituting a dead space is utilized for forming threaded holes 55, 56. Therefore, the space otherwise required for threaded holes is saved, and the screws are invisible from the surface which is desirable from the design viewpoint.

Figure 18:
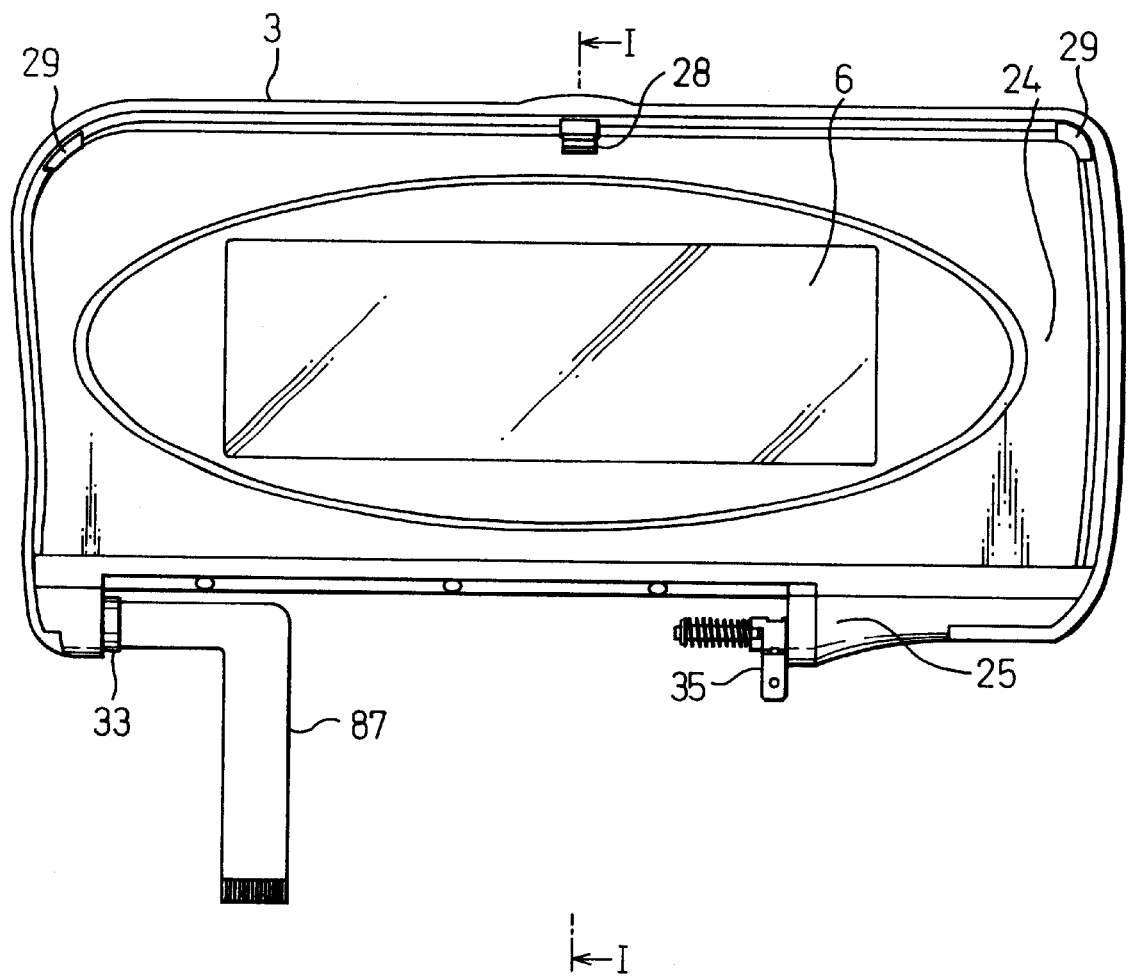
FIG. 18 shows a configuration of the lid of the portable electronic device of FIG. 1.
Figure 19:
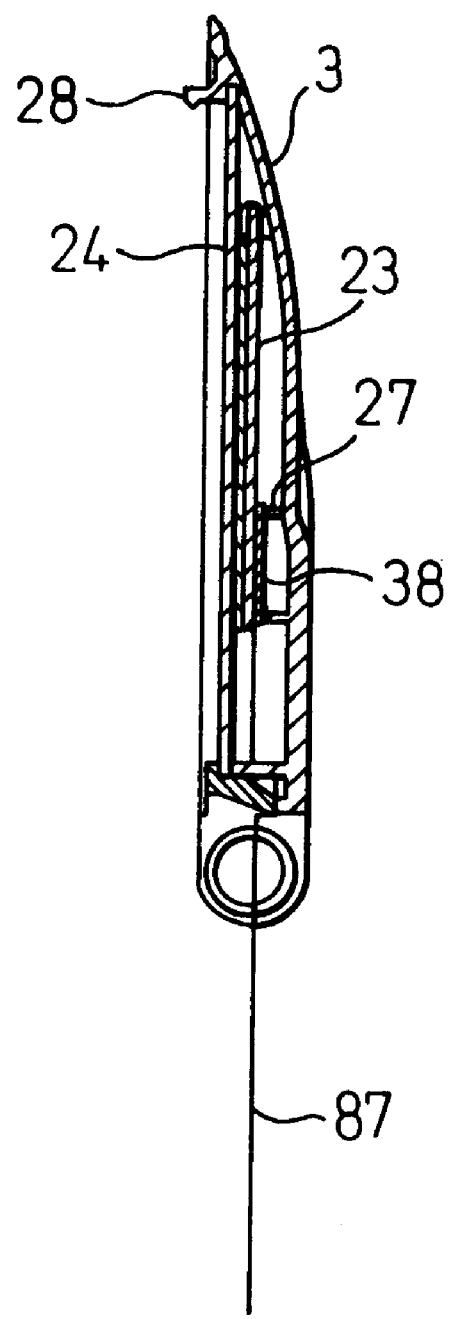
FIG. 19 is a sectional view taken in line I—I of FIG. 18.

FIGS. 18 and 19 show a configuration of the lid 3. FIG. 18 shows the assembled state of the lid 3, and FIG. 19a a sectional view taken in line I—I in FIG. 18.

The lid 3 has a liquid crystal display panel 23 mounted on the inner surface thereof, and the surface thereof is covered with a decorative panel 24. A structure for mounting these component parts will be described later. Also, a latch 28 for engagement between the lid 3 and the body 2 is formed at the intermediate point of the upper side of the lid 3. This latch 28 engages a member on the body 2 side when the lid 3 is closed. For opening the lid 3, on the other hand, an open/close knob 17 (FIG. 5, etc.) arranged on the front of the body 2 is pushed. Then, the member on the body 2 side is disengaged and the lid 3 becomes ready to open. A well-known mechanism can be used for this purpose and will not be described in detail.

As shown in FIG. 18, a hinge mechanism for supporting the lid 3 rotatably on the body 2 is arranged at the lower part of the lid 3. This hinge mechanism includes a semicylindrical portion 33 providing a rotational axis arranged on the lower left side of the lid 3 and a lever 35 arranged on the right side. This configuration is also described in detail later. Also, FIG. 18 shows a printed wiring board 87 constituting a part of the liquid crystal display panel 23.

Figure 20:
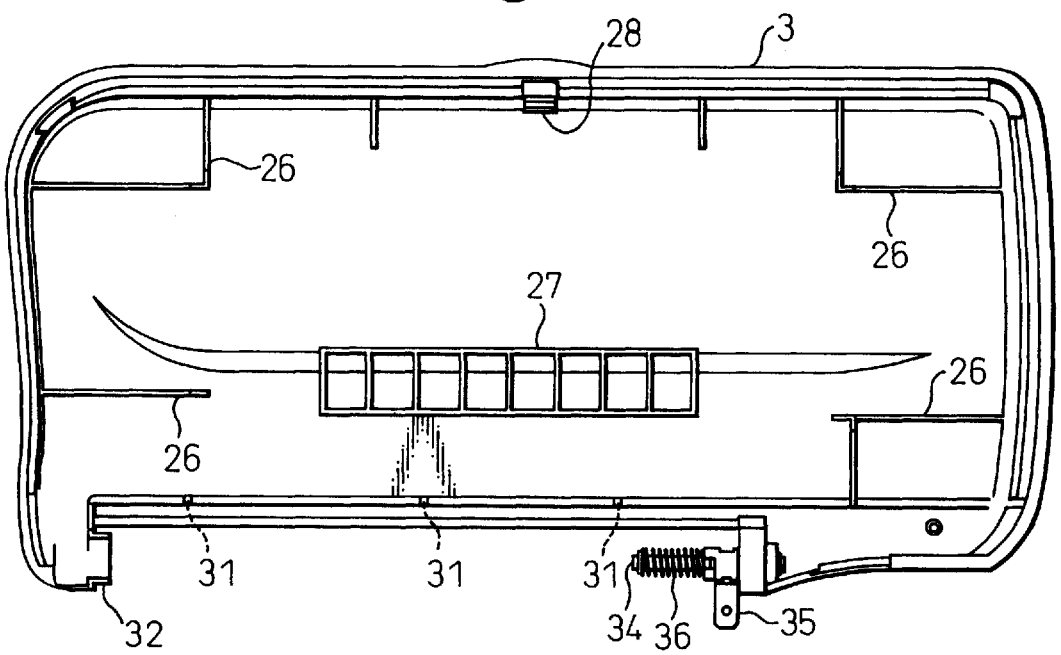
Figure 21:
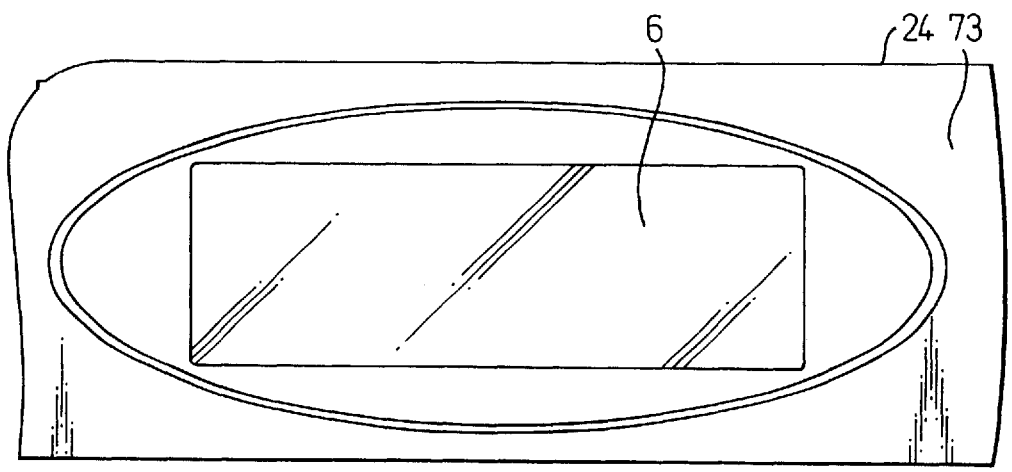
Figure 22:
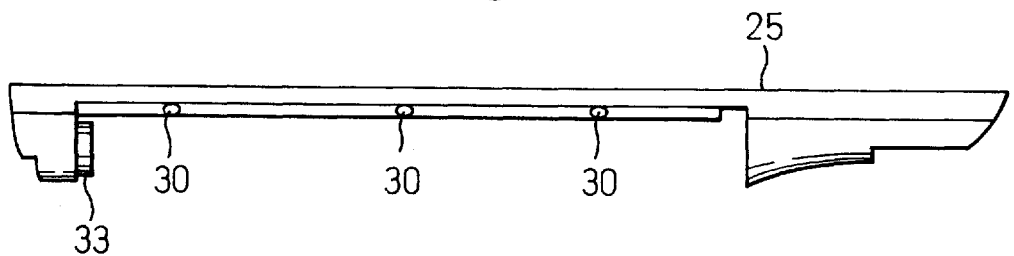
Figure 23:
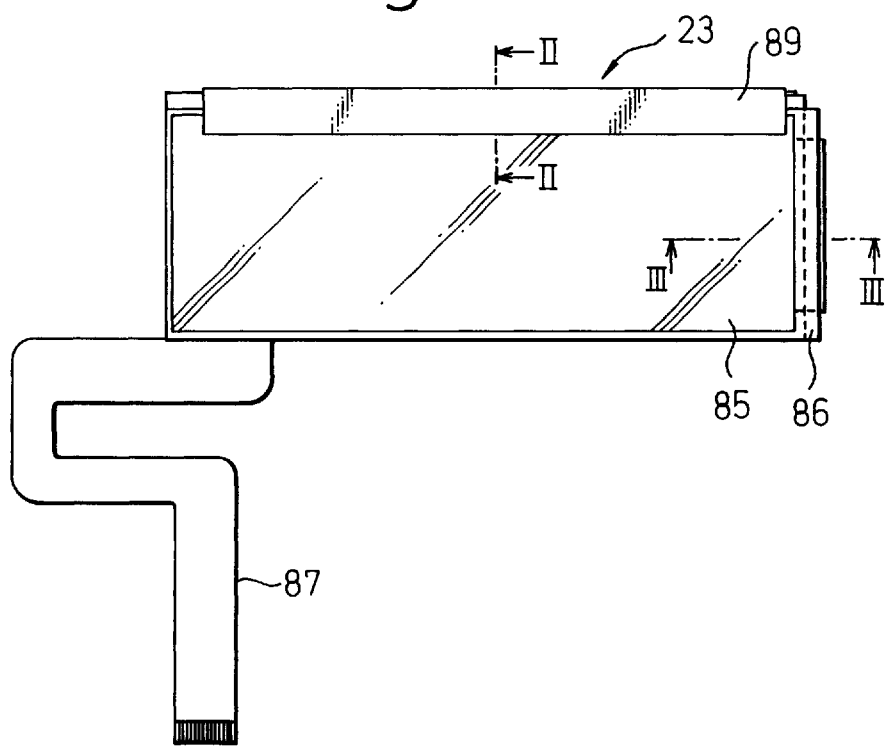
Figure 24:
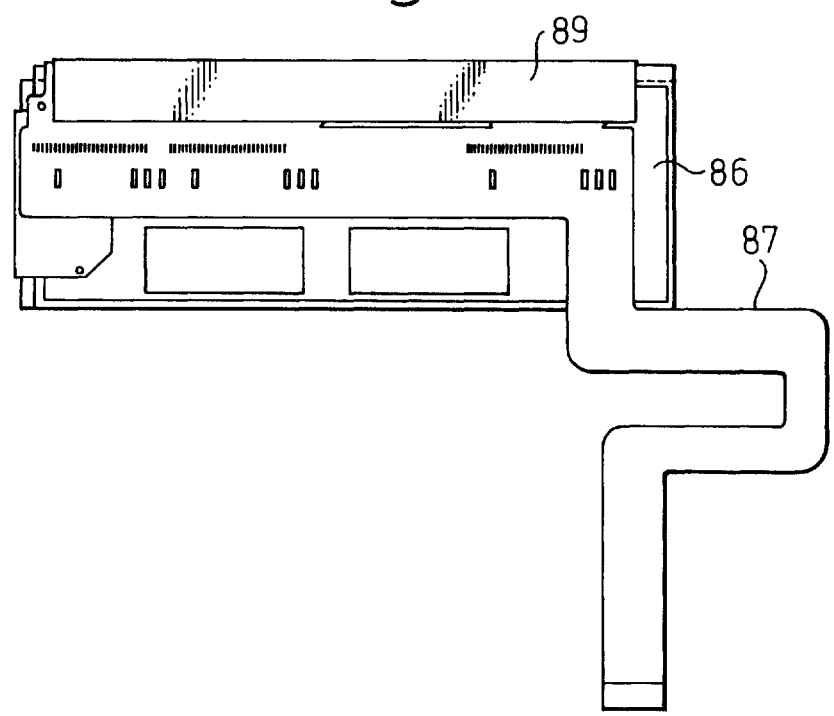

FIGS. 20 to 23 are an exploded view of the parts, FIG. 20 shows a configuration of the lid body, FIG. 21 shows the decorative panel 24, FIG. 22 shows a fixed member, and FIG. 23 shows the liquid crystal display panel.

Four ribs 26 are formed on the inner surface of the lid 3 shown in FIG. 20. These ribs 26 engage the four corners of the liquid crystal display panel 23 shown in FIG. 23 and fix the liquid crystal display panel 23 in position. A grid rib 27 for fixing the liquid crystal display panel 23 to the lid 3 is formed at a position intermediate of the four ribs 26. As shown in the sectional view of FIG. 19, a double-sided adhesive tape 38 is attached on the reverse side of the liquid crystal display panel 23, and the other side of the double-sided adhesive tape 38 is bonded to the grid rib 27. The reduced area of bonding between the double-sided adhesive tape 38 and the grid rib 27 reduces the adhesive strength and makes it easy to separate the liquid crystal display panel 23 from the lid 3.

The surface of the liquid crystal display panel 23 is covered by the decorative panel 24 shown in FIG. 21. The decorative panel 24 is formed of a transparent plastic. A transparent display window 6 is formed at the central portion of the liquid crystal display panel 23 constituting a display area thereof, and the peripheral part thereof makes up an opaque printing area 73. As shown in FIG. 18, the decorative panel 24 is set in position with the upper side thereof defined by engaging two holders 29 and part of the latch 28 formed on the inner upper side of the lid 3. The lower side of the decorative panel 24, on the other hand, is fixed by a fixing member 25 shown in FIG. 22. The fixing member 25 is formed with threaded holes 30, and is screwed by use of the holes 30 and threaded holes 31 of the lid 3 (FIG. 20). Also, the fixing member 25 includes a semicylindrical portion 33 forming part of a hinge mechanism.

A hinge mechanism for rotatably supporting the body is arranged at the lower part of the lid 3 shown in FIG. 20. The semicylindrical portion 32 formed on the lid 3 and the semicylindrical portion 33 formed on the fixing member 25 form a cylindrical shaft when the fixing member 25 is integrated with the lid 3. This shaft is rotatably supported on the body 2. Also, a mechanism is provided for applying friction to the open/close operation of the lid 3. This mechanism includes a metal shaft 34, a metal lever 35 rotatably about the shaft 34 and a spring 36 for pressing the lever 35 against the fixed part of the shaft 34 with an appropriate strength. The lever 35 engages a recess formed in the body 2. When the lid 3 is opened/closed, the lever 35 is fixedly screwed to the body 2 and gives an appropriate friction to the open/close operation of the lid 3 with the force exerted by a spring 6. The relation between the hinge mechanism and the lid 3 and the body 2 will be described later in detail.

The liquid crystal display panel 23 will be described with reference to FIGS. 23 to 28. FIG. 23 is a front view of the liquid crystal display panel 23, FIG. 24 a rear view, FIG. 25 a side view, FIG. 26 a perspective view, FIG. 27 a sectional view taken in line II—II of FIG. 23, and FIG. 28 a sectional view taken in line III—III of FIG. 23.

Figure 27:
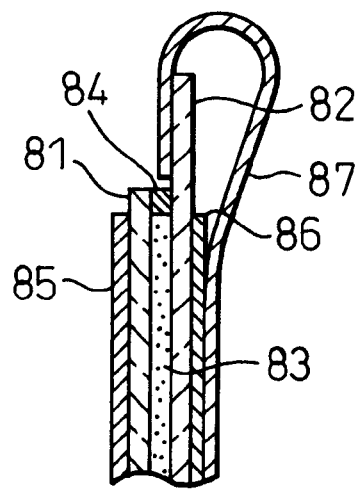
Figure 28:
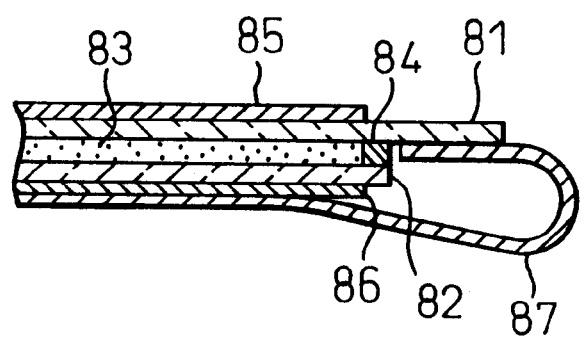

The liquid crystal display panel 23, as shown in FIGS. 27 and 28, is configured with a liquid crystal 83 contained by a seal 84 between an upper glass plate 81 and a lower glass plate 82. Polarizers 85, 86 are arranged outside the upper glass plate 81 and the lower glass plate 82, respectively. A transparent electrode (not shown) of a predetermined pattern is formed inside the upper glass plate 81 and the lower glass plate 82. The transparent electrode is connected to a printed wiring board 87 on one side of the upper glass plate 81 and the lower glass plate 82.

The printed wiring board 87 includes a flexible base material and is arranged on the back of the liquid crystal display panel 23. The upper edge of the printed wiring board 87, as shown in FIG. 27, is bent by the upper end of the lower glass plate 82, led to the front of the lower glass plate 82, and connected to the front transparent electrode. The right edge of the printed wiring board 87, as shown in FIG. 28, is bent and connected to the transparent electrode on the back of the upper glass plate 81.

Figure 25:
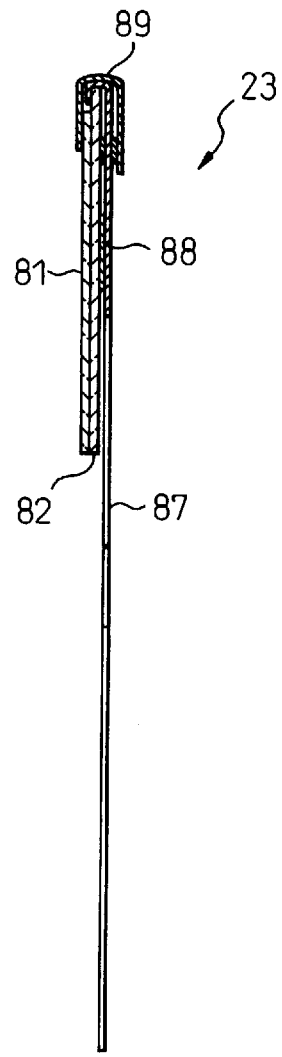
Figure 26:
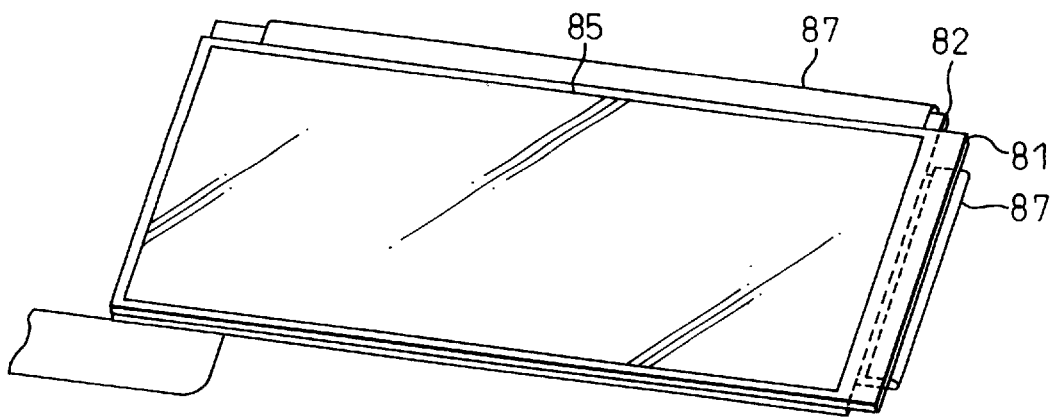

The printed wiring board 87, as shown in FIG. 25, is fixedly bonded to the back of the liquid crystal display panel 23 by means of a double-sided adhesive tape 88. The upper side of the liquid crystal display panel 23 is covered with a black adhesive plastic tape 89. The tape 89 covers the connector of the printed wiring board 87 on the front side of the liquid crystal display panel 23, and covers the IC arranged on the printed wiring board 87 on the back of the liquid crystal display panel 23. As a result, the tape 89 exerts a force to bend the printed wiring board 87 on the one hand and prevents the erroneous operation by shielding the IC arranged on the printed wiring board 87 from the external light. As an alternative to the tape 89, a U-shaped member of a metal (such as Cu. Al or SUS) can be used for an improved effect. FIG. 26 shows the state with the tape 89 removed.

Figure 29:
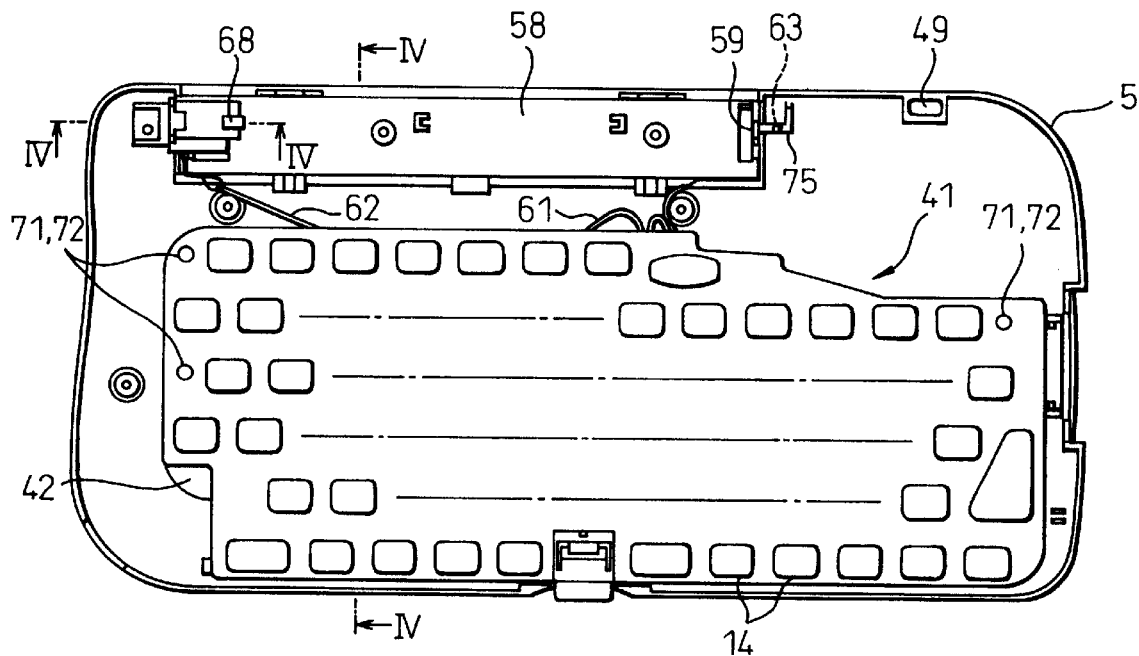
FIG. 29 shows the portable electronic device of FIG. 1 with the electronic unit mounted on the lower cover thereof.
Figure 30:
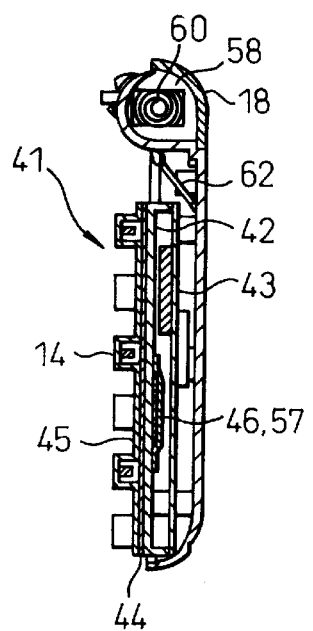
FIG. 30 is a sectional view taken in line IV—IV of FIG. 29.

FIG. 29 shows the lower cover with the electronic device body 41 housed. FIG. 30 is a sectional view taken in line IV–IV in FIG. 29. The electronic device body 41 has an intermediate frame 42. A printed substrate 43 is arranged on the lower surface of the intermediate frame 42, and a contact pad 44 is arranged on the upper surface thereof. Further, a key pad 45 is arranged on the contact pad 44. The keys 14 formed on the key pad 45 are exposed to the operating section 47 on the surface of the upper cover 4 from holes 37 (FIG. 4) formed in the upper cover 4. The intermediate frame 42 and the printed substrate 43 are screwed to the lower cover 5. The contact pad 44 and the key pad 45, on the other hand, are formed with positioning holes 71 which engage protrusions 72 formed on the intermediate frame 42 to set the assembly in position.

Figure 31:
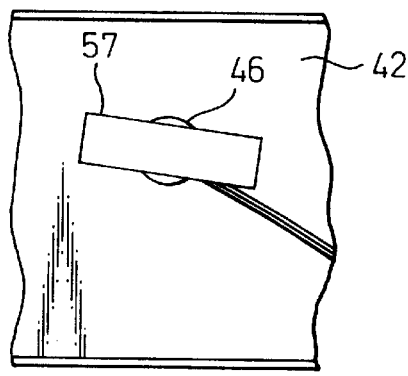
FIG. 31 shows the state in which a piezoelectric speaker is mounted in FIG. 29.

In order to sound a beep in accordance with the operation of the device, a piezoelectric speaker 46 is built in the electronic device body 41. As shown in FIG. 30, the piezoelectric speaker 46 is arranged on the back of the intermediate frame 42 and, as shown in FIG. 31, is attached with an adhesive tape 57. The mounting work using the adhesive tape 57 is simple and low in cost.

A battery case 58 is arranged at the hinge side of the lower cover 5. The battery case 58, as shown in FIG. 30, forms a space allowing the battery to be placed in or taken out from under the lower cover 5. A battery cover is applied to the battery case 58. The outline of the battery cover 18 is shown in FIG. 11. The battery case 58 has at the ends thereof a positive (+) electrode 59 and a negative (−) electrode, which are connected to the electronic device body 41 by means of lead wires 61, 62, respectively.

Figure 32:
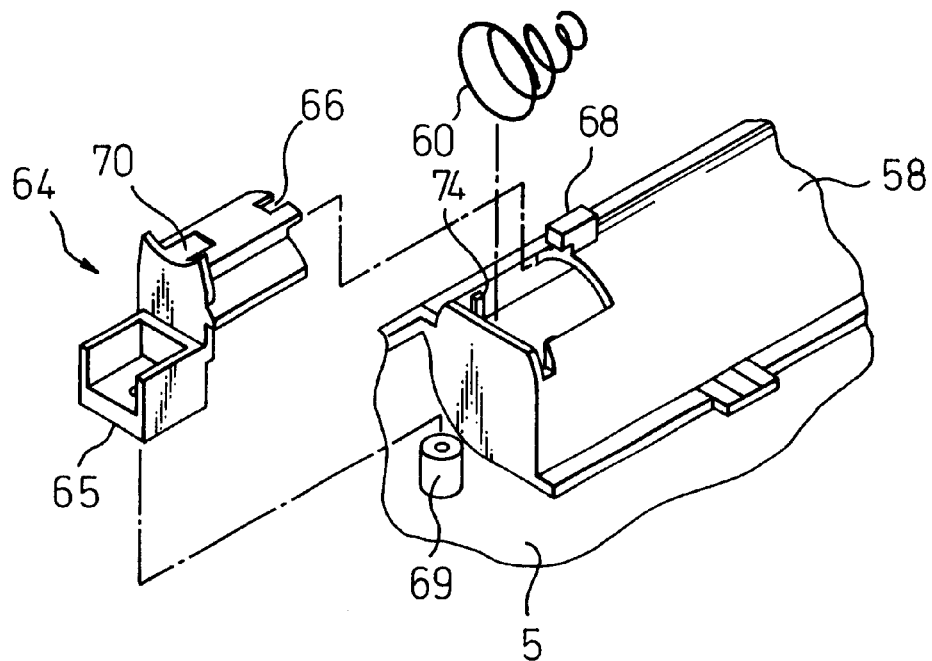
FIG. 32 shows the battery case of FIG. 29 in detail.
Figure 33:
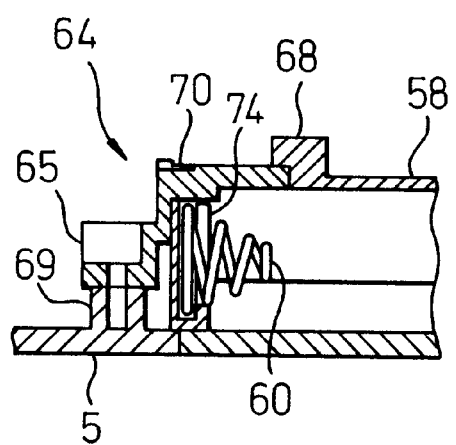
FIG. 33 is a sectional view of the battery case of FIG. 32.

FIGS. 32 and 33 show a mount for the negative electrode 60. FIG. 32 shows a development of the parts, and FIG. 33 is a sectional view of the assembly.

The mount for the negative electrode 60 of the battery case 58 has a cut-out. A helical spring constituting the negative electrode 60 is inserted into the battery case by way of the cut-out portion and the base thereof held between the rib 74 and the wall of the battery case. After the negative electrode 60 is inserted, the cut-out portion is covered by the cover 64. The forward end 66 of the cover 64 engages a protrusion 68 formed on the battery case 58, and the mount on the opposite side is screwed to a boss 69 formed on the lower cover 5. Consequently, the mounting structure of the negative electrode 60 is simple and facilitates the mounting work as compared with the prior art. The cover 64 functions as a support of the hinge mechanism at the same time. In the battery case 58, the cover 64 acts to hold both the negative electrode 60 and the hinge mechanism of the lid 3 at the same time, thereby contributing to a reduced size of the device 1.

Figure 34:
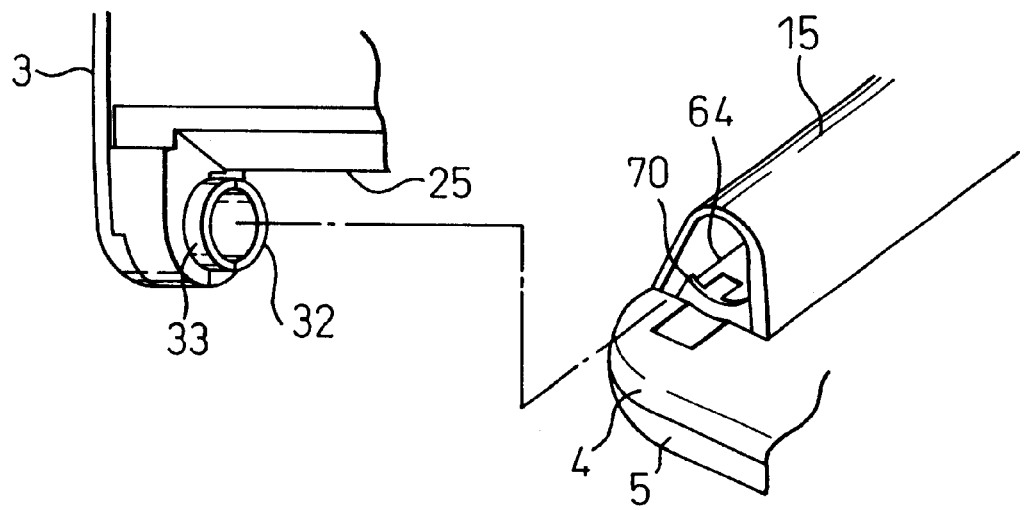
FIGS. 34 and 35 is a detailed view of a hinge for coupling the body and the lid.
Figure 35:
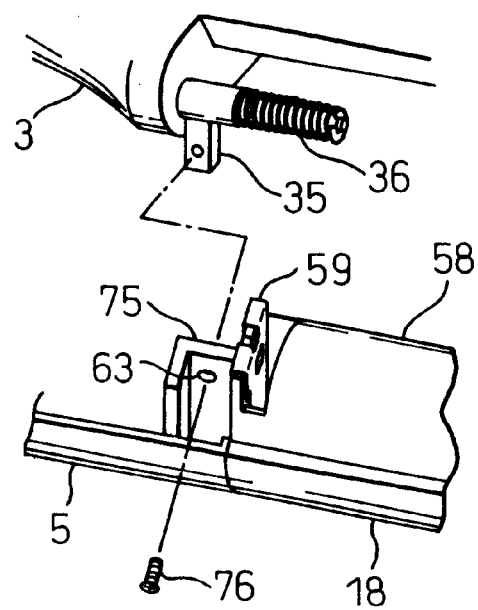

FIGS. 34 and 35 are diagrams showing a hinge mechanism between the body 2 and the lid 3.

FIG. 34 shows a configuration of the shaft of the lid 3 and the bearing of the body 2. As explained above with reference to FIGS. 20 to 21, once the fixing member 25 is mounted on the lid 3, the semicylindrical portions 32, 33 form a single cylindrical shaft. When the battery case 58 of the body 2 (FIG. 32) is covered with the hinge cover 15, on the other hand, the hinge cover 15 and the recess 70 of the cover 64 form a bearing. As a result, the lid 3 is rotatably supported on the body 2 at this portion.

FIG. 35 shows a configuration of the portion exerting friction on the hinge mechanism. A lever 35 shown in FIG. 20 is rotatably mounted on the lid 3. A rib 75 is formed on the lower cover 5 of the body 2 and is formed adjacently to the positive electrode 59 of the battery case 58. A hole is formed in the lever 35 and the rib 75, which are thus fixedly mounted by a screw 76.

What is claimed is:

1. A portable electronic device comprising:

an electronic unit;

a cable connected to said electronic unit;

a connector connected to a forward end of said cable;

a body formed of an upper cover and a lower cover for housing said electronic unit therein;

an operating section arranged on an upper surface of said upper cover;

a lid rotatably joined to a side of said body for covering the upper surface of said upper cover;

a hole formed in the upper surface of said upper cover for passing said cable from an interior of said body out of said body;

a groove formed continuous with said hole in the upper surface of said upper cover for accommodating said cable; and a depression formed continuous with said groove in the upper surface of said upper cover for accommodating said connector.

2. A portable electronic device according to claim 1, further comprising a guide groove formed in the upper surface of said upper cover adjacent to said hole for guiding said cable out of a side of said body.

3. A portable electronic device according to claim 2, wherein said hole is formed in a side of the upper surface of said upper cover opposite to the side of the body to which the lid is joined, and said guide groove is formed at a corner of the upper surface of said upper cover.

4. A portable electronic device according to claim 3, wherein said guide groove is formed at an angle of 45° to the sides of said upper cover forming said corner.

5. A portable electronic device according to claim 1, wherein at least a hole for screwing said upper cover to said lower cover is formed in the bottom of the groove of said upper cover for accommodating said cable.

6. A portable electronic device according to claim 1, wherein a further connector is arranged in a side of said body and covered by a mask arranged on a surface of said side of said body, and said upper cover and said lower cover are fixedly screwed to sides of said further connector inside said mask.

7. A portable electronic device according to claim 1, wherein said depression for accommodating said connector and said groove for accommodating said cable are arranged on the upper surface of said upper cover along a hinge side of said body to which said lid is rotatable joined, and a battery case is formed inside said body between said hinge side of said body and said groove for accommodating said cable.

8. A portable electronic device according to claim 7, wherein a groove for inserting the base of a coil spring for a negative electrode is formed in said battery case, and said groove is covered and said coil spring is held by a member forming a groove for receiving a shaft constituting a hinge mechanism for said lid.

9. A portable electronic device according to claim 1, wherein said depression for accommodating said connector and said groove for accommodating said cable are arranged along a hinge side of said body to which said lid is rotatably joined, a strap hole for attaching a strap is formed at a corner of the hinge side of said body, and a notch is formed in a portion of said lid corresponding to said strap hole.

10. A portable electronic device according to claim 1, further comprising a liquid crystal display mounted on said lid, wherein said liquid crystal display is bonded to the inside surface of said lid with a double-sided adhesive tape, and a grid rib is formed on the inside surface of said lid for bonding said double-sided adhesive tape in a small area.

11. A portable electronic device according to claim 10, wherein said liquid crystal display includes a liquid crystal plate, a flexible wiring board electrically connected to said liquid crystal plate on the front side is bent and arranged on the back of said liquid crystal plate, and said bent portion is covered with a light-shielding one-side adhesive tape to thereby reinforce said bent portion while at the same time masking an IC circuit arranged on said flexible wiring board.

12. A portable electronic device according to claim 1, wherein said electronic unit includes a buzzer using a piezoelectric element, said buzzer being fixed on the frame of said electronic unit with a one-side adhesive tape.

* * * * *